US010591603B2

(12) United States Patent
Nagalla et al.

(10) Patent No.: US 10,591,603 B2
(45) Date of Patent: Mar. 17, 2020

(54) RETROREFLECTOR ACQUISITION IN A COORDINATE MEASURING DEVICE

(71) Applicant: FARO Technologies, Inc., Lake Mary, FL (US)

(72) Inventors: Kalyan Nagalla, Downingtown, PA (US); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/179,314

(22) Filed: Nov. 2, 2018

(65) Prior Publication Data

US 2019/0146089 A1   May 16, 2019

Related U.S. Application Data

(60) Provisional application No. 62/586,401, filed on Nov. 15, 2017.

(51) Int. Cl.
*G01S 17/66* (2006.01)
*G01S 7/481* (2006.01)
(Continued)

(52) U.S. Cl.
CPC ............. *G01S 17/66* (2013.01); *G01C 15/00* (2013.01); *G01C 15/002* (2013.01); *G01S 7/481* (2013.01); *G01S 17/023* (2013.01)

(58) Field of Classification Search
CPC ........ G01S 17/66; G01S 17/42; G01S 7/4818; G01S 7/497; G01S 17/89; G01S 7/4813; G01S 5/163; G01S 7/491; G01S 7/4808; G01S 3/786; G01S 7/4812; G01S 17/023; G01S 17/325; G01S 7/4817; G01S 7/481; G01S 7/4917; G01S 17/36; G01S 3/783; G01S 7/4811; G01S 7/4972; G01S 17/87; G01S 7/4863; G01S 17/06; G01S 17/08; G01S 17/102; G01S 17/48; G01S 17/50; G01S 17/58; G01S 17/74; G01S 1/70; G01S 7/48; G01S 7/499; G01S 17/32; G01S 17/46; G01S 7/003; G01S 7/4814; G01C 3/08; G01C 15/002; G01C 15/06; G01C 15/02; G01C 15/00; G01C 15/004; G01C 25/00; G01C 3/02; G01C 3/10; G02B 5/122; G02B 2027/0138; G02B 27/0172;

(Continued)

(56) References Cited

U.S. PATENT DOCUMENTS 8,537,375 B2   9/2013   Steffensen et al.
8,670,114 B2   3/2014   Bridges et al.
(Continued)

FOREIGN PATENT DOCUMENTS

EP   2801841 A1   11/2014
WO   2007079601 A1   7/2007

OTHER PUBLICATIONS

Extended European Search Report for Application No. 18205716.6 dated Mar. 27, 2019; 9 pgs.

*Primary Examiner* — Michael P Stafira
(74) *Attorney, Agent, or Firm* — Cantor Colburn LLP

(57) ABSTRACT

A tracker includes a retro-follow mode that causes a beam of light from the tracker to follow a retroreflector while locked onto the retroreflector with the beam of light turned on or, alternatively, using target cameras with the beam of light turned off.

20 Claims, 8 Drawing Sheets

(51) Int. Cl.
*G01S 17/02* (2020.01)
*G01C 15/00* (2006.01)

(58) Field of Classification Search
CPC .... G02B 26/101; G02B 26/108; G02B 5/124; G02B 7/182; G02B 5/12; G02B 5/132; G02B 6/32; G01N 21/93
See application file for complete search history.

(56) References Cited

U.S. PATENT DOCUMENTS

| | | | |
|---|---|---|---|
| 9,151,830 B2 | 10/2015 | Bridges | |
| 2005/0179890 A1* | 8/2005 | Cramer | G01B 11/002 356/138 |
| 2012/0262550 A1* | 10/2012 | Bridges | G01C 15/002 348/46 |
| 2013/0229512 A1 | 9/2013 | Steffey et al. | |
| 2014/0204363 A1* | 7/2014 | Slotwinski | G01S 17/325 356/5.09 |
| 2015/0308818 A1* | 10/2015 | Bridges | G01S 17/66 356/3.02 |
| 2015/0331159 A1* | 11/2015 | Bridges | G01C 15/004 359/515 |
| 2015/0365653 A1* | 12/2015 | Tohme | G01B 11/14 348/46 |
| 2015/0377605 A1* | 12/2015 | Bridges | G06T 7/73 382/106 |
| 2016/0178348 A1 | 6/2016 | Nagalla et al. | |
| 2016/0341541 A1* | 11/2016 | Bridges | G01B 11/002 |

* cited by examiner

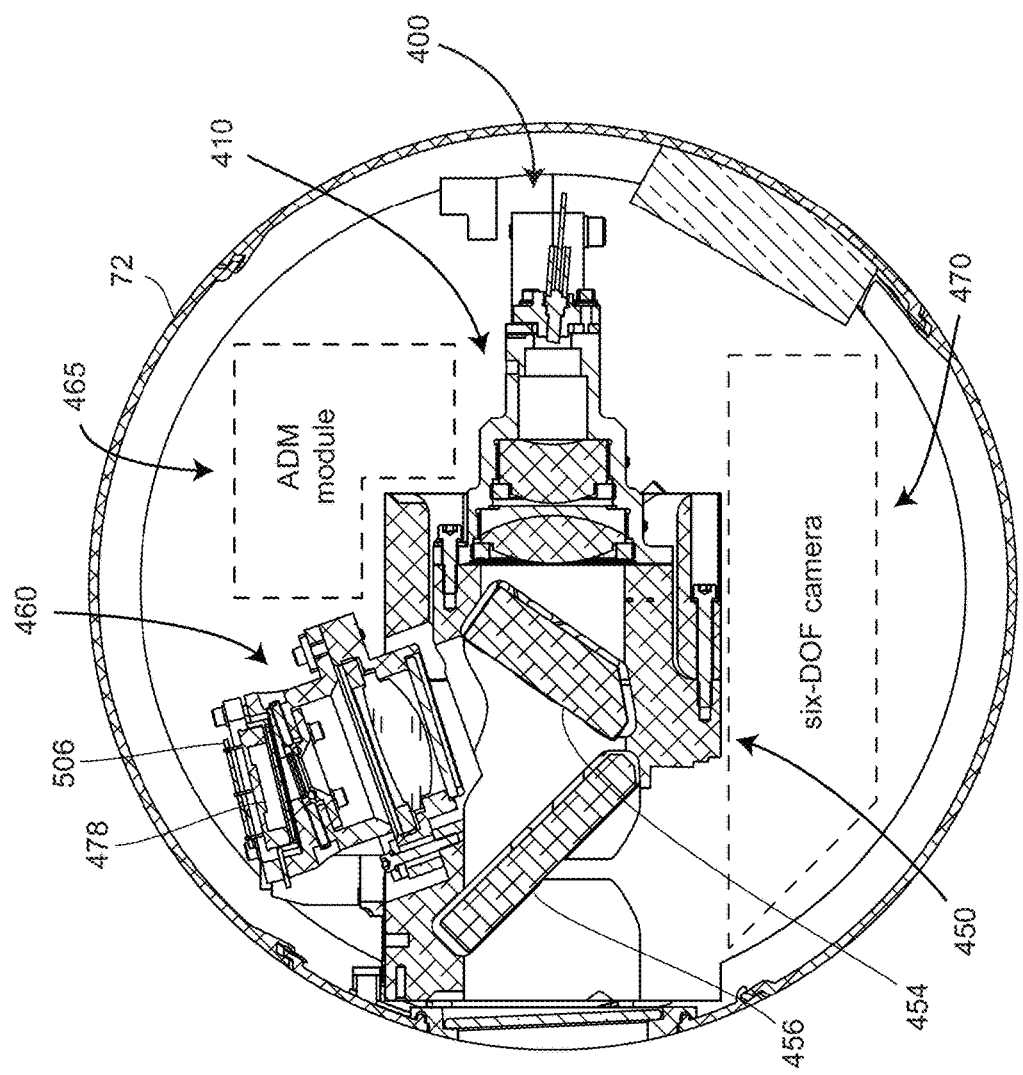
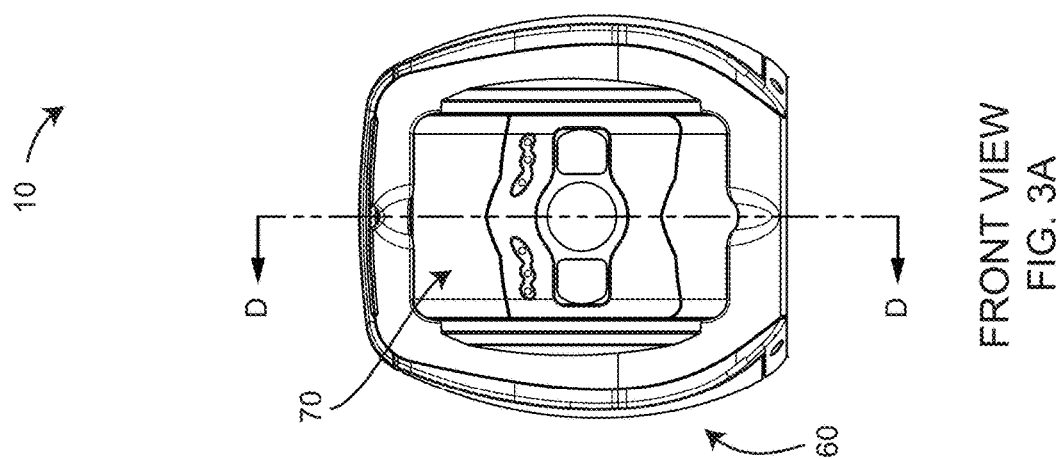

TOP VIEW

FRONT VIEW

RETROREFLECTOR ACQUISITION IN A COORDINATE MEASURING DEVICE

CROSS REFERENCE TO RELATED APPLICATIONS

This application claims the benefit of U.S. Provisional Application Ser. No. 62/586,401 filed Nov. 15, 2017, the entire disclosure of which is incorporated herein by reference.

BACKGROUND

The present disclosure relates to a coordinate measuring device. One set of coordinate measurement devices belongs to a class of instruments that measure the three-dimensional (3D) coordinates of a target point by sending a beam of light to the point. The beam of light may impinge directly on the point or on a retroreflector target in contact with the point. In either case, the instrument determines the coordinates of the target point by measuring a distance and two angles to the target. The distance is measured with a distance-measuring device such as an absolute distance meter or an interferometer. The angles are measured with an angle-measuring device such as an angular encoder. The beam may be steered with a gimbaled mechanism, a galvanometer mechanism, or other mechanism.

A tracker is a particular type of coordinate-measuring device that tracks the retroreflector target with one or more beams it emits, which may include light from a laser or non-laser light source. Coordinate-measuring devices closely related to the tracker include a total station. A total station is a 3D measuring device most often used in surveying applications. It may be used to measure the coordinates of a diffusely scattering target or a retroreflective target. Hereinafter, the term tracker is used in a broad sense to include trackers as well as total stations and to include dimensional measuring devices that emit laser or non-laser light.

In many cases, a tracker sends a beam of light to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface of the SMR rests remains constant, even as the SMR is rotated. Consequently, the tracker can measure the 3D coordinates of a surface by following the position of an SMR as it is moved over the surface. Stating this another way, the tracker measures only three degrees of freedom (one radial distance and two angles) to fully characterize the 3D coordinates of a surface.

One type of tracker contains only an interferometer (IFM) without an absolute distance meter (ADM). If an object blocks the path of the beam of light from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner. Some trackers contain only an ADM without an interferometer.

A gimbal mechanism within the tracker may be used to direct a beam of light from the tracker to the SMR. Part of the light retroreflected by the SMR enters the tracker and passes onto a position detector. A control system within the tracker uses position of the light on the position detector to adjust the rotation angles of the mechanical axes of the tracker to keep the beam of light centered on the SMR. In this way, the tracker is able to follow (track) a moving SMR.

Angle measuring devices such as angular encoders are attached to the mechanical axes of the tracker. The one distance measurement and two angle measurements of the tracker are sufficient to specify a three-dimensional location of the SMR. In addition, several trackers are available or have been proposed for measuring six degrees-of-freedom (six-DOF), rather than the ordinary three degrees-of-freedom.

A difficulty that sometimes occurs in using trackers is the losing tracking of a beam of light when an operator passes the retroreflector behind an obstruction or rotates the retroreflector outside its acceptance angle. In these cases, in one mode of operation, the beam of light may remain fixed after tracking is lost. In response, the operator must use other means to recapture the beam. In another mode of operation, the tracker immediately begins seeking the lost retroreflector with cameras affixed to the tracker. However, with this approach, if there are other retroreflectors in the environment, the tracker may redirect the beam of light to the incorrect retroreflector.

An approach sometimes used to distinguish light reflected from retroreflectors from light generated or reflected by other objects in an environment is to provide flashing lights around tracker target cameras and then to subtract alternative camera images. With proper timing of the cameras and lights, this serves to remove constant background lights while retaining the flashing retroreflector lights in camera images. However, flashing lights around the target cameras, when combined with the beam of light from the tracker, may produce undesirable camera patterns when subtracted, causing problems in acquiring retroreflectors.

Although trackers are generally suitable for their intended purpose, the need for improvement remains, particularly in rapidly and flexibly locking onto and tracking retroreflector targets and recovering from the situation in which the tracker beam is sent to the wrong retroreflector.

SUMMARY

According to an embodiment of the present invention, a method comprises: for a tracker in a retro-follow mode: determining whether a beam of light emitted along an optical axis of the tracker is detected by a position detector of the tracker; if the beam of light is detected by the position detector, tracking on the retroreflector by moving the beam of light to a retrace point of the position detector; and if the beam of light is not detected by the position detector, turning off the beam of light, attempting to identify a retroreflector in first images captured by one or more cameras of the tracker, and steering the optical axis toward the identified retroreflector, continuing until a retroreflector acquisition criterion has been met by the first images, thereafter turning on the beam of light.

In accordance with one or more embodiments, or in the alternative, when the beam of light is detected within the position detector but not detected within a predetermined area of the position detector, steering the beam of light in a search pattern until the beam of light is detected within the predetermined area of the position detector, thereafter tracking on the retroreflector. In accordance with one or more embodiments, or in the alternative, the search pattern is a spiral search pattern. In accordance with one or more embodiments, or in the alternative, the method further comprises: turning on one or more flashing light sources proximate the one or more cameras to produce flashing light; and reflecting the flashing light from the retroreflector onto the one or more cameras.

In accordance with one or more embodiments, or in the alternative, the retroreflector acquisition criterion is based at least in part on a measure of movement, per unit of time, of the retroreflector in a succession of the first images. In accordance with one or more embodiments, or in the alternative, the measure of movement is based at least in part on one or more quantities selected from the group consisting of: angles, distances, and pixels. In accordance with one or more embodiments, or in the alternative, the retroreflector acquisition criterion is based at least in part on a position of the retroreflector in the first images. In accordance with one or more embodiments, or in the alternative, the tracker is placed in the retro-follow mode based at least in part on a gesture performed by a user.

In accordance with one or more embodiments, or in the alternative, the gesture includes a spatial movement of the retroreflector. In accordance with one or more embodiments, or in the alternative, the spatial movement of the retroreflector is captured in a succession of the first images. In accordance with one or more embodiments, or in the alternative, the method further comprises turning on the beam of light if the retroreflector is not identified in the first images within a prescribed time interval.

In accordance with one or more embodiments, or in the alternative, the method further comprises steering the optical axis to a new direction if the retroreflector is not identified in the first image. In accordance with one or more embodiments, or in the alternative, the tracker is placed in the retro-follow mode based at least in part on an entry made by an operator into a device that includes a processor.

In accordance with one or more embodiments, or in the alternative, the method further comprises: placing the tracker in a retro-grab mode; for the tracker in the retro-grab mode: turning on the beam of light; pointing the beam of light in a fixed direction until the beam of light, upon reflection from the retroreflector, is detected within the position detector; after receiving the beam of light within the position detector, moving the beam of light to arrive, upon reflection from the retroreflector, at a retrace point of the retroreflector; and tracking on the retroreflector based at least in part on the signal produced by the position detector in response to the beam of light reflected from the retroreflector onto the position detector. In accordance with one or more embodiments, or in the alternative, the retro-grab mode is activated with a gesture performed by a user.

In accordance with one or more embodiments, or in the alternative, the method further comprises: placing the tracker in a user-follow mode; for the tracker in the user-follow mode: attempting to identify a user in the first images of the one or more cameras of the tracker; and when the user is identified in the first images, steering the optical axis to follow movement of the user. In accordance with one or more embodiments, or in the alternative, the tracker is placed in the user-follow mode based at least in part on a gesture performed by a user. In accordance with one or more embodiments, or in the alternative, the method further comprises in response to determining that the beam of light emitted on the optical axis of the tracker is not detected by the position detector, turning off at least one light marker 98 that is positioned directly adjacent the retroreflector.

According to another embodiment of the present invention, a three-dimensional (3D) measuring system comprises: a tracker including a source of light, a position detector, one or more target cameras, and a tracking system, the source of light operable to emit a beam of light along an optical axis of the tracker, the position detector operable to produce an electrical signal based at least in part on a position of light on a surface of the position detector, the position detector having a retrace point, the tracking system operable to steer the optical axis; a processor coupled to the tracker, the processor operable to execute computer instructions that, when executed on the processor includes: determining whether the tracker is in a retro-follow mode; for the tracker in the retro-follow mode: determining whether a beam of light emitted on the optical axis of the tracker is detected by the position detector; if the beam of light is detected by the position detector, tracking on a retroreflector with the tracking system by moving the beam of light to arrive at the retrace point; and if the beam of light is not detected by the position detector, turning off the beam of light, attempting to identify the retroreflector in first images of the one or more target cameras, steering the optical axis toward the retroreflector until a retroreflector acquisition criterion has been met by the first images, thereafter turning on the beam of light.

In accordance with one or more embodiments, or in the alternative, the the processor is further operable to execute computer instructions that, when executed on the processor includes determining that the beam of light is detected within the position detector but not detected within a predetermined area of the position detector and, in response to so determining, steering the beam of light in a search pattern until the beam of light is detected within the predetermined area of the position detector, thereafter tracking on the retroreflector.

Technical effects of embodiments of the present disclosure include the tracking of a retroreflective target with a tracker. Further technical effects of embodiments of the present disclosure further include the non-contact controlling of the tracker by a user through the use of gestures performed by the user.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 3A and FIG. 3B are front and section views, respectively, of the payload assembly according to an embodiment of the present invention;

DETAILED DESCRIPTION

Figure 1:
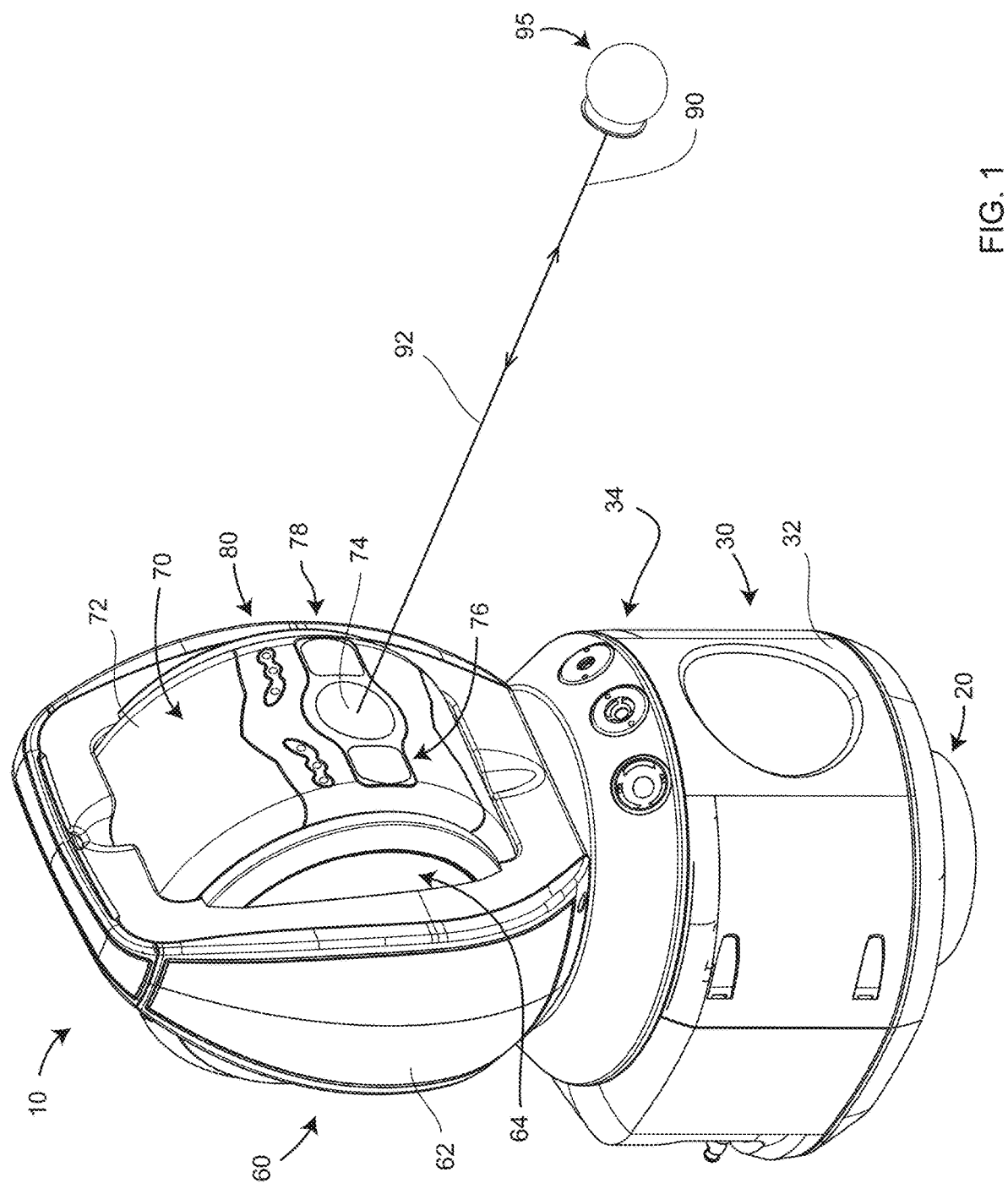
FIG. 1 is an isometric view of a tracker and a retroreflector target in accordance with an embodiment of the present invention.

A tracker 10 is shown in FIG. 1. As explained in the introduction, the term tracker is here in a general sense that includes total stations. The beam of light 90 may come from a laser, a superluminescent diode, a light emitting diode (LED), or other type of collimated light source.

The tracker 10 in FIG. 1 sends outgoing light 90 through an exit aperture 74 to a retroreflector 95, which returns the light along a parallel path as returning light 92, which passes a second time through the exit aperture 74. The tracker includes a base assembly 30, a yoke assembly 60, and a payload assembly 70. An outer portion of the payload assembly 70 includes payload assembly covers 72, a first target camera 76, a second target camera 78, and payload indicator lights 80. The target cameras are also referred to as locator cameras. In an embodiment, the indicator lights 80 may emit a predetermined first color, such as green for example, to indicate found target, a second predetermined color, such as red for example, to indicate measuring, and other predetermined colors, such as blue or yellow for example, for user-definable or six-DOF indications. In an embodiment, an outer portion of the yoke assembly 60 includes yoke-assembly covers 62 and yoke indicator lights 64. In an embodiment, yoke indicator lights may advantageously be seen at large distances from the tracker. An outer portion of the base assembly 30 includes base-assembly covers 32 and magnetic home-position nests 34 operable to hold SMRs of different diameters. In an embodiment, three magnetic home-position nests 34 accept SMRs having diameters of 1.5 inches, 0.875 inch, and 0.5 inch. A mandrel 20 may optionally be attached to a lower portion of the tracker 10.

Figure 2:
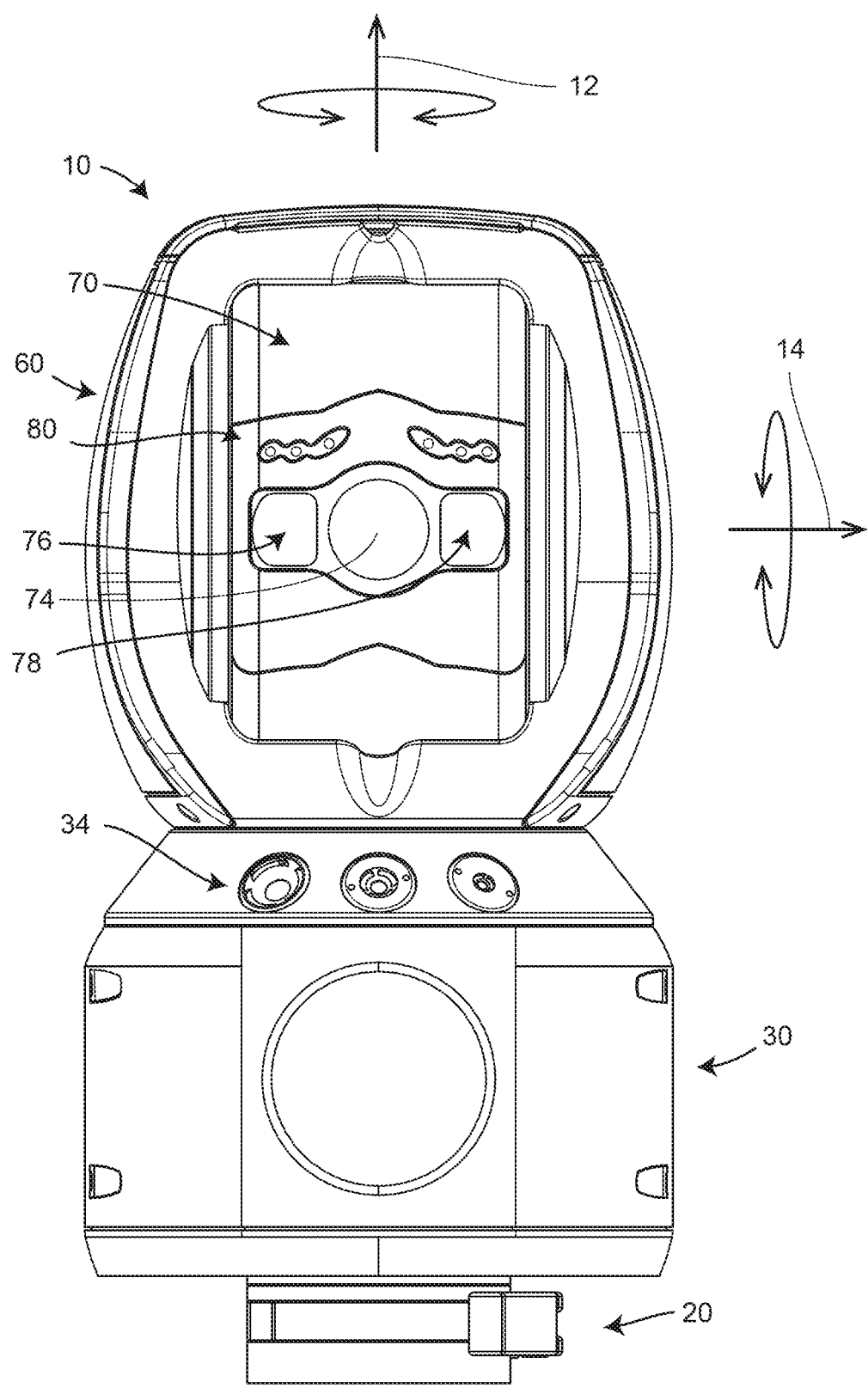
FIG. 2 is a front view of a tracker according to an embodiment of the present invention.

FIG. 2 shows a front view of the tracker 10. The base assembly 30 is ordinarily stationary with respect to a work area, for example, being mounted on an instrument stand or an industrial tripod. The yoke assembly 60 rotates about an azimuth axis 12, sometimes referred to as a standing axis or a vertical axis, although it should be appreciated that the tracker 10 may, in general, be positioned upside down or be rotated to an arbitrary angle with respect to a floor. The payload assembly 70 rotates about a zenith axis 14, sometimes referred to as a transit axis or a horizontal axis.

FIG. 3A is a front view of the payload assembly 70 and an upper portion of the yoke assembly 60. FIG. 3B is a cross-sectional view D-D (as shown in FIG. 3A) showing optical elements within the payload assembly 70. Optical elements placed mainly along a central portion of the payload assembly 70 are referred to as a central-optics assembly 400 as shown in FIG. 3B, which includes a launch/collimator assembly 410 and a position-detector assembly 460. Outside the central-optics assembly 410 are an ADM module 465 and a six-DOF launch 470.

The combiner assembly 450 is used to combine the launch/collimator assembly 410 with the position-detector assembly 460, and it is also used to combine different beams of light from the position detector splitter 454 and the six-DOF splitter 456. The position-detector assembly 460 includes a position detector 478 mounted on a position-detector circuit board 506. The position detector 478 is a detector that converts light into electrical signals and further provides secondary electrical signals that enable determination of a position at which light strikes a surface area of the position detector 478. Examples of position detectors include a lateral effect detector, a quadrant detector, a complementary metal-oxide-semiconductor (CMOS) array, and a charge-coupled detector (CCD).

The position-detector assembly 460 is ordinarily used to keep the outgoing beam of light 90 centered or nearly centered on a moving retroreflector 95, thereby causing the returning beam of light 92 to follow the same path as the outgoing beam of light 90. A control system (also referred to as a tracking system) causes the tracker motor to steer the beam to keep moving the beam toward the center of the position detector, thereby enabling tracking of the retroreflector 95 with the tracker 10. In practice, when the outgoing beam is exactly centered on a retroreflector, the returning beam may fall a little off a center of the position detector 478. The position on the position detector of the return beam when the outgoing beam is centered on the retroreflector is referred to as the retrace point of the position detector.

In an embodiment, the tracker 10 is a six-DOF tracker that uses a six-DOF camera 470 and a six-DOF probe 480 to determine six degrees-of-freedom of the six-DOF probe 480. In an embodiment, the six-DOF probe 480 includes a tactile probe 410 capable of measuring with a probe tip 416 object features not directly accessible by the beam of light 90 from the tracker 10. In other words, a retroreflector 440 coupled to the six-DOF probe 480 may be in a direct line-of-sight of the beam of light 90, while an object feature measured by the probe tip 416 is hidden from view. In other embodiments, the tactile probe 410 is replaced by another type of six-DOF probe such as a six-DOF line scanner, a six-DOF area scanner, a six-DOF indicator, a six-DOF sensor, or a six-DOF projector. Examples of such six-DOF probes are given in U.S. Pat. No. 9,151,830, the contents of which are incorporated by reference.

Figure 4A:
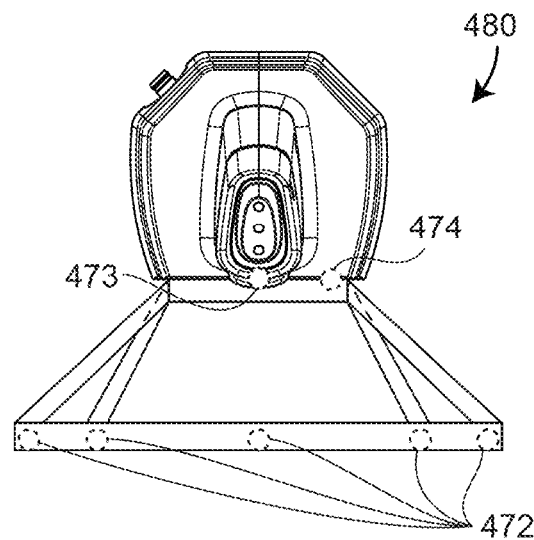
FIG. 4A and FIG. 4B are top and front views, respectively, of a six-DOF probe according to an embodiment of the present invention.
Figure 4B:
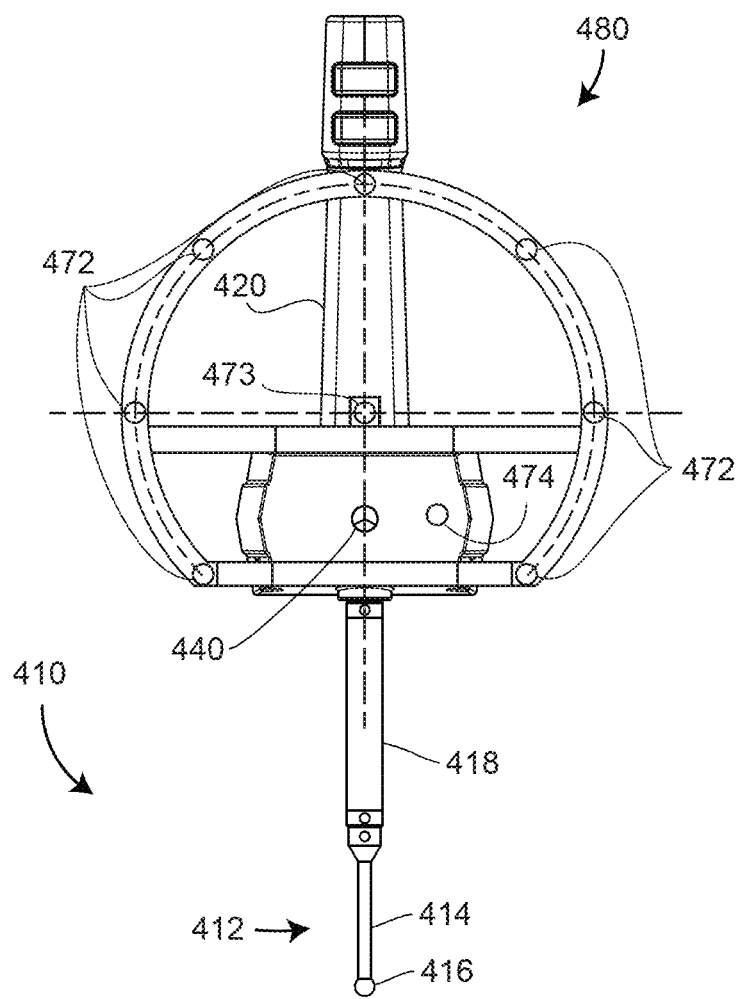

In an embodiment illustrated in FIGS. 4A, 4B, the tactile probe 480 includes a stylus 412 and a stylus extension 418, the stylus 412 further including the probe tip 416 and a stem 414. In an embodiment, the tactile probe 410 is screwed into a threaded hole coupled to a frame-handle 420 that serves as a handle and that further encloses a retroreflector 440 and lights 472, 473, 474. In an embodiment, the lights 472, 473, 474 are imaged by the six-DOF camera 470 from which are determined three orientation angles of the probe 980. In an embodiment, the three orientation angles are a pitch angle, a yaw angle, and a roll angle. The three translational degrees of freedom, for example, x, y, z, are obtained by measuring the position of the retroreflector 440 with the tracker. The three translational degrees of freedom and the three rotational degrees of freedom combine to give six degrees of freedom, which is sufficient along with the geometry of the six-DOF probe 480, to determine the 3D coordinates of the probe tip 416. The six-DOF probe 480 is compatible with capture of images of the lights 472, 473, 474 by the camera 470. Many other types of six-DOF probes are possible; the probe illustrated in FIGS. 4A, 4B show only one possibility. Furthermore, in some embodiments, the tactile probe 410 is replaced by a triangulation scanner that measures 3D coordinates using a projector and a camera.

Figure 5:
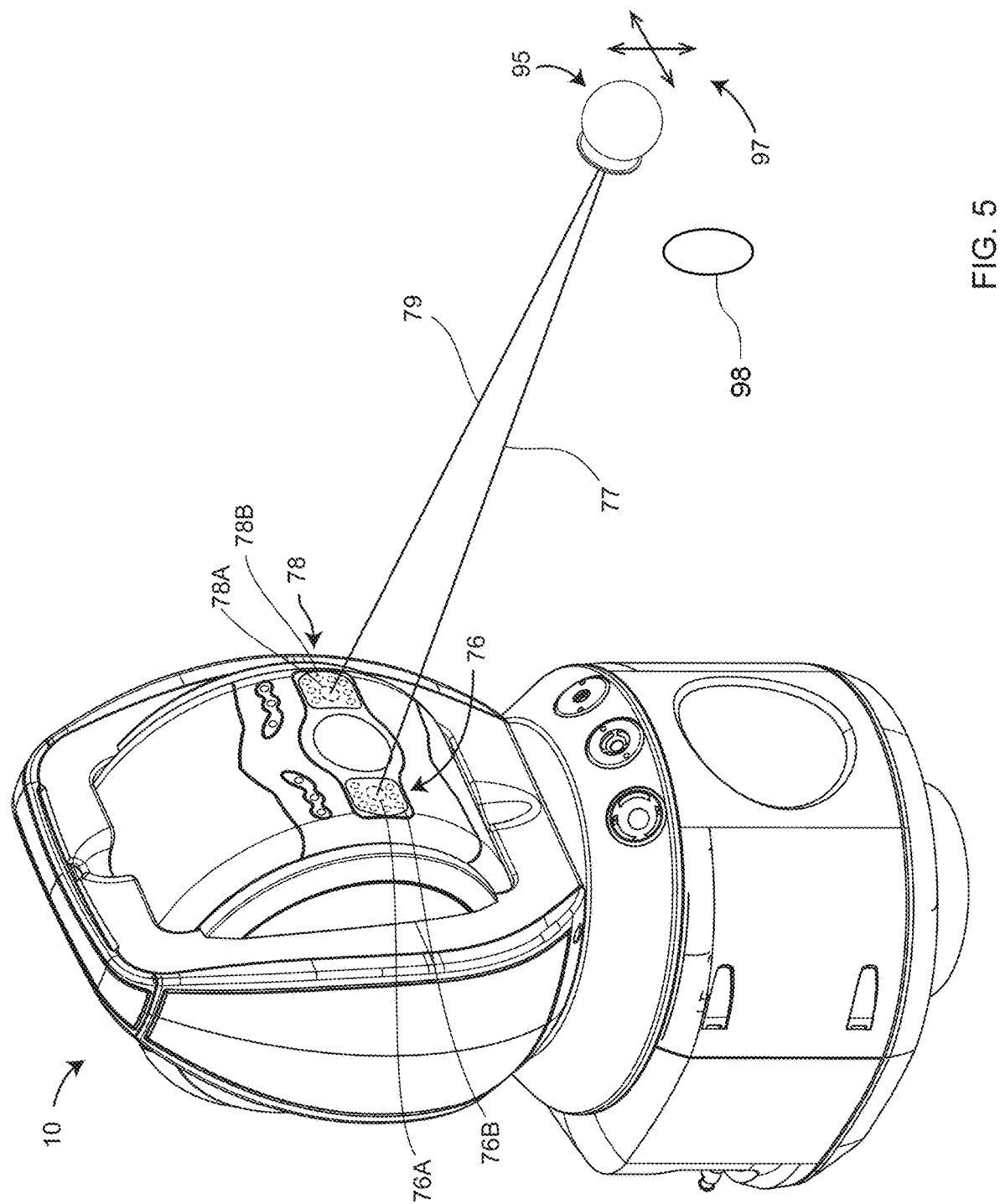
FIG. 5 is an isometric view of a tracker having an SMR illuminated by lights surrounding cameras according to an embodiment of the present invention.

In an embodiment illustrated in FIG. 5, one or more target cameras 76, 78 are used to locate one or more retroreflectors 95 in an environment. A stereo pair of target cameras, such as cameras 76, 78, is described in U.S. Pat. No. 8,670,114, the contents of which are incorporated by reference herein. In an embodiment, the light sources 76B, 78B, located close to the camera photosensitive arrays 76A, 78A, are periodically flashed at regular intervals. The flashing lights 76B, 78B illuminate the retroreflector 95. Reflected beams of light 77, 79 travel to the photosensitive arrays 76A, 78A, respectively. In an embodiment, the image capture rate of the photosensitive arrays 76A, 78A is set to half the flash rate of the lights 76B, 78B so that the retroreflector 95 appears to be brightly and dimly illuminated in alternate images. In an embodiment, the dimly illuminated retroreflector images are subtracted from the brightly illuminated retroreflector images, thereby obtaining bright a bright image spot for each illuminated retroreflector. However, the light from the light sources 76B, 78B is not reflected in a concentrated manner from non-retroreflective objects. Consequently, background images when subtracted appear to be relatively dim compared to the retroreflectors. This use of flashing lights 76B, 78B greatly simplifies the identification of retroreflectors in the environment.

In an embodiment, the light sources 76B, 78B are light emitting diodes (LEDs) that emit light at a near infrared wavelength such as 850 nm. In an embodiment, the beam of light 92 shown in FIG. 1 includes a different wavelength such as 635 nm, which corresponds to red light. In an embodiment, it is desirable for the cameras 76, 78 to accept visible wavelengths as well as the wavelengths emitted by the light sources 76B, 78B as this provides color images that further show bright flashing spots of light at the locations of retroreflectors such as the retroreflector 95 or the retroreflector 440. Hence, to achieve this desirable outcome, the cameras 76, 78 may receive combined light from the returning beam 92 and from the flashing light sources 76B, 78B. In some cases, such a combination of light sources used to illuminate a retroreflector may produce distortions in the images of the retroreflectors received by the photosensitive arrays 76A, 78A. To avoid this problem, in an embodiment the outgoing beam of light 90 is turned off when using the target cameras 76, 78 to determine the location of retroreflectors such as 95, 440.

Figure 6:
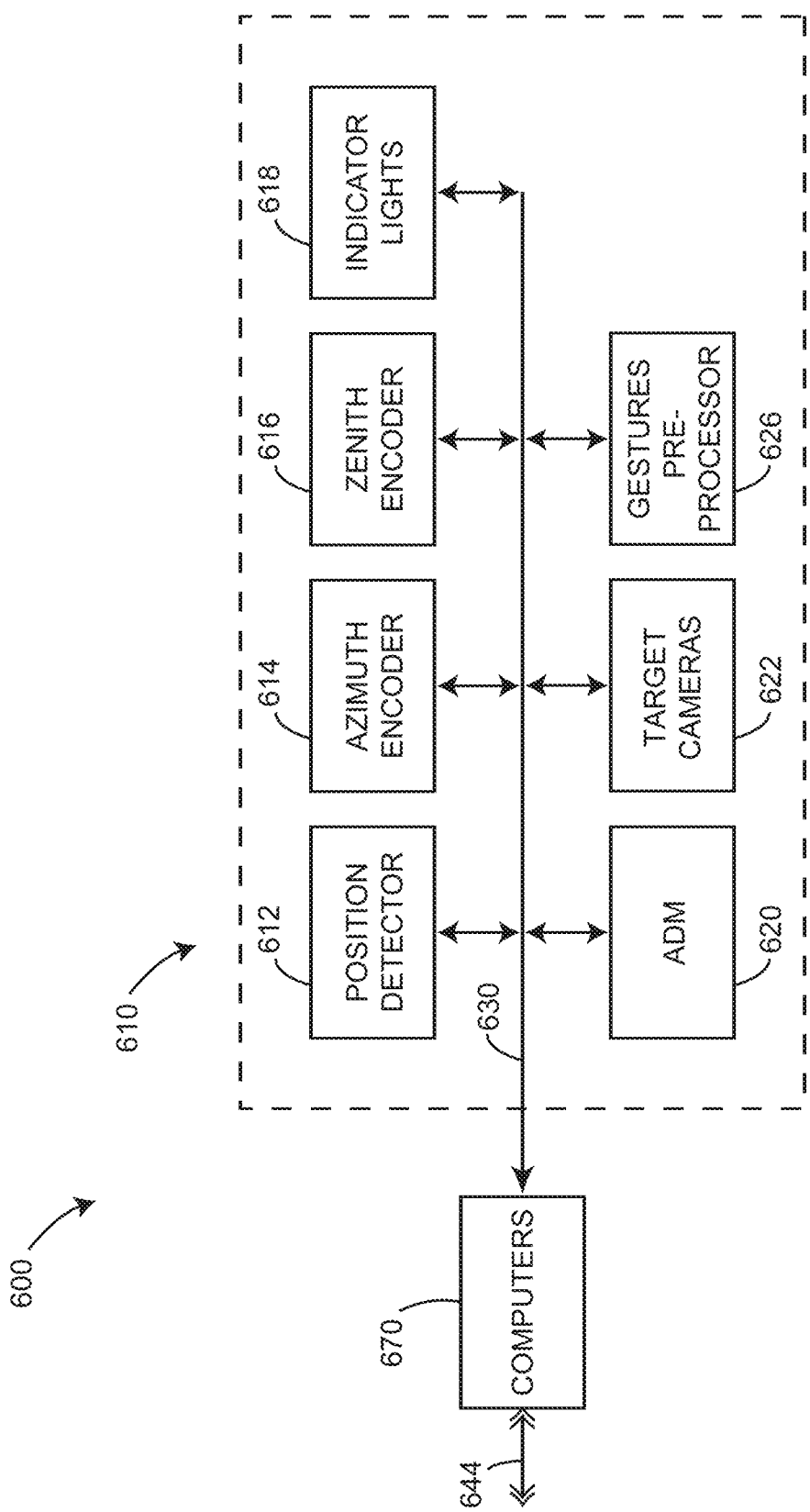
FIG. 6 shows electrical and computing elements coupled to a tracker according to an embodiment of the present invention.

FIG. 6 shows a computing system 600 coupled to the tracker 10, either as computing components within the tracker or as external computing components coupled to the tracker computing system, possibly by a networking link such as a link 644. The term computing system as used herein is taken as having the same meaning as processing system or simply processor. The term processor as used herein is taken to include all components used to support computing. Memory elements such as registers, cache, volatile memory, non-volatile memory, and remote storage are included as a part of the processor. Devices such as central processing units (CPUs), field-programmable gate arrays (FPGAs), digital signal processors (DSPs), and all support electronics that connect together computing and memory components are also included. Input/output devices through which the computing and memory elements receive information, possibly from a user, are also included as a part of the processor. Some typical computing functions 610 found in a laser tracker 10 are shown in FIG. 6. In an embodiment, these include position detector processing 612, azimuth encoder processing 614, zenith encoder processing 616, indicator lights processing 618, absolute distance meter (ADM) processing 620, target camera processing 622, and gestures pre-processing 626. This is only a partial list of processing functions included within the tracker. The processing elements within the tracker are connected to one another and to external computers 670 through a bus 630. Communication with external computers, including networked computers, may be carried out through wired or wireless communication channels.

Figure 7:
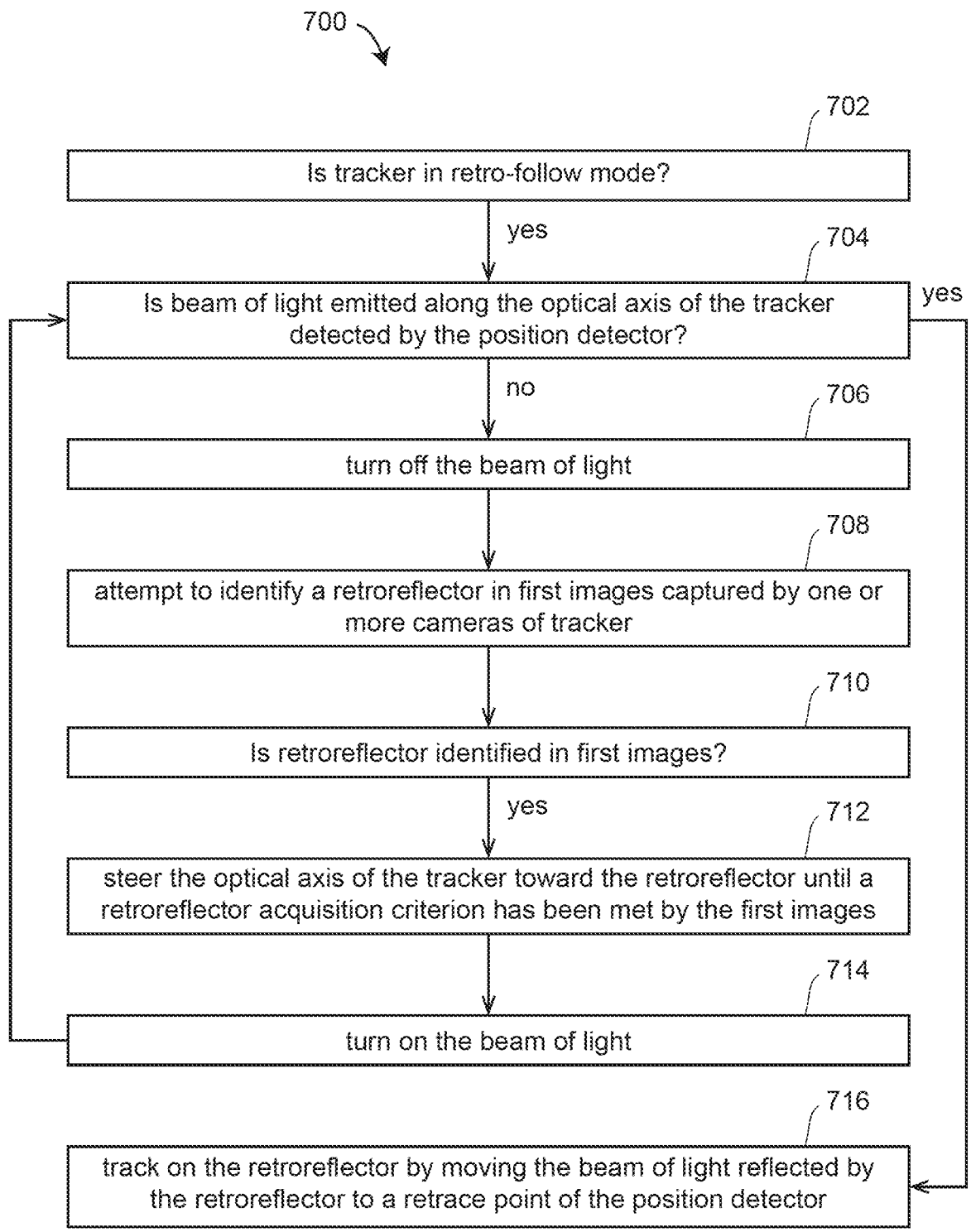
FIG. 7 is a flow chart showing conceptual elements of a retro-follow mode of a laser tracker according to an embodiment of the present invention.

In an embodiment, the tracker may operate in any of several modes. In a "retro-follow" mode, the tracker 10 generally attempts to follow the movement of a retroreflector such as the retroreflector 95. A method 700 for operating the tracker in a retro-follow mode is illustrated in the flow chart of FIG. 7. Element 702 determines whether the tracker is operating in a retro-follow mode. A processor, as described herein above in relation to FIG. 6, may be used to make this determination. Element 704 determines whether a beam of light emitted along an optical axis of the tracker is detected by a position detector of the tracker. Such a beam of light is emitted as a beam 90 and returned to the position detector as a portion of the beam 92 as illustrated in FIG. 1. If the beam of light is detected by the position detector, the element 716 is executed, resulting in tracking on the retroreflector. Such tracking is achieved by continually moving the beam of light to the retrace point of the position detector.

If the beam of light is not detected by the position detector in the element 704, the element 706 is executed, turning off the beam of light. In element 708, an attempt is made to identify the retroreflector in first images captured by the one or more target cameras. When the retroreflector is identified in the first images in element 710, the optical axis of the tracker is steered toward the retroreflector until a retroreflector acquisition criterion has been met by the first images in element 712, after which the beam of light is turned on in element 714. When the tracker is still in retro-follow mode, control passes again to element 704 to check whether the beam of light is within the position detector. When the beam of light is within the position detector, control passes to element 716, where tracking begins. When the beam of light is not within the position detector, the beam of light is again turned off at element 706 and the tracker continues to steer the optical axis toward the retroreflector.

In an embodiment of the retro-follow mode, if the outgoing beam of light 90 is reflected by the retroreflector 95 as the beam 92 and received by the position detector 478, the tracker uses the motors of its tracking system to direct the outgoing beam 90 toward the center of the retroreflector 95, centering the reflected beam of the return beam 90 on the retrace point of the position detector 478. For the case in which the outgoing beam of light 90 is not reflected by a retroreflector 95 and hence not detected as a return beam 92 by the position detector 478, the outgoing beam of light 90 is turned off. When the retroreflector is seen in first images captured by the target cameras 76, 78, the tracking system begins steering the optical axis of the tracker toward the retroreflector. When the retroreflector is a cube-corner retroreflector having three mutually perpendicular reflecting surfaces, the optical axis is steered toward the vertex of the retroreflector. In this application, the term vertex is used in a general way to refer to a reflection point of the retroreflector. Some types of retroreflectors such as spherical (cat-eye) retroreflectors do not have a physical vertex, but it is understood that the term vertex is used to refer herein to a primary reflection point of the retroreflector.

The optical axis of the tracker is the axis through which the beam of light 92 leaves the tracker and returns to the tracker. The position of the retroreflector in the first images indicates the direction the position of the retroreflector 95 in space in relation to the tracker. Positions on the photosensitive arrays 76A, 78A of the target cameras 74, 76 are indicative of angles of objects in relation to a perspective center of the camera lens systems. Hence the positions of a retroreflector 95 on first images of the cameras 76, 78 may be used to determine the angles of the retroreflector 95 in relation to the cameras 76, 78. In an embodiment, the positions of a retroreflector 95 on the photosensitive arrays 76A, 78A are used to determine the direction to which the tracker optical axis should be steered to place the retroreflector 95 on the tracker optical axis.

In the retro-follow mode, the outgoing beam of light 90 is turned off if the return beam of light 92 is not detected by the position detector 478. The tracking system then steers the optical axis of the tracker toward the vertex of the retroreflector. The beam is steered toward the retroreflector until a retroreflector acquisition criterion has been met, after which it stops moving the beam of light toward the retroreflector vertex. Several types of retroreflector acquisition criteria are possible. One possible retroreflector acquisition criterion is based at least in part on a measure of movement per unit time as determined from a succession of first images obtained from the cameras 76, 78. The measure of movement may be based at least in part on one or more quantities selected from the group consisting of angles, distances, and pixels. Movement according to a change in the position of the retroreflector in the first images given in terms of pixels provides a way for a beam of light from the tracker to catch up with a moving retroreflector and then follow the movement of the retroreflector with the tracker optical axis. In this case, the retroreflector spot will be seen in the same pixel location in each of the succession of captured first images. In other cases, it may be desirable to have the retroreflector held still relative to the tracker. In this case, the movement may be determined based on a change in angle of the retroreflector as seen in tracker space. In this case, the tracker optical axis would be moved to a position fixed in space. Hence in this case, the retroreflector acquisition criterion may be based on stability of the optical axis in relation to the retroreflector. Likewise side-to-side (transverse) movements of the object may be evaluated in units of distance rather than in units of angle.

Alternatively, the acquisition criterion may be based at least in part on a position of the retroreflector in the first images. For the case of stereo cameras 76, 78, the cameras will appear in a given position for the retroreflector at a given distance from the tracker. In general, the positions of the retroreflector in the first images obtained by the cameras may be used to determine whether the retroreflector is on or nearly on the optical axis of the tracker 10. In addition, a collection of different criteria may form the basis of the acquisition criterion.

In the retro-follow mode, when it is determined that the retroreflector acquisition criterion has been met, the beam of light is turned back on. If the beam of light is not detected by the position detector, the tracker again turns off the beam of light 90 and continues to steer the optical axis toward the retroreflector. On the other hand, if the beam of light is detected by the position detector, the tracker moves the beam of light toward the retrace point of the position detector. The tracker then continues to track on the retroreflector based at least in part on a signal produced by the retroreflector in response to the beam of light reflected from the retroreflector onto the position detector.

In some cases, the returning beam of light 92 lies on the position detector but outside a desired spot (e.g. a predetermined area) of the position detector. When the returning beam of light 92 lies in the desired spot, the tracking system may immediately drive the beam of light 92 to the retrace point. When the returning beam of light lies outside the desired spot, a search pattern may be used to drive the return beam of light 92 to the retrace position. For example, the search pattern may be a spiral search in which the beam of light begins by circling in an ever expanding spiral until the beam is driven into the desired spot, after which it is driven to the retrace position and tracking commenced.

Another situation that may occur is that the tracker is that a retroreflector is located outside the fields-of-view of the one or more cameras of the tracker. In this situation, a user may want to have the tracker target cameras search for retroreflectors outside the current FOV. This may be done by turning the optical axis of the tracker to a different angle than its current angle. For example, the tracker may make horizontal steps every 40 degrees about the tracker, looking for retroreflectors in each case.

In another case, an operator may want to have the beam of light from the tracker turned for the tracker in the retro-follow mode if the target cameras do not see any cameras within a prescribed time interval (a specified amount of time that might be included in tracker settings)—for example, if no retroreflectors are seen within ten minutes.

A common situation is one in which there are several retroreflectors located within the fields-of-view of the one or more target cameras, such as the target cameras 76, 78. In this situation, a user may have locked onto a beam of light 90 from the tracker 10 and is tracking the beam of light 90 across a room by walking with the SMR while holding the beam of light locked onto the retroreflector. If the beam path to the retroreflector is broken, for example, because the retroreflector is moved behind an obstruction or the user turns the retroreflector outside its acceptance angle, the tracker operated in the retro-follow mode may lock onto another retroreflector in the environment. In this case, the beam of light has moved to a different retroreflector than the one desired by the user.

Figure 8:
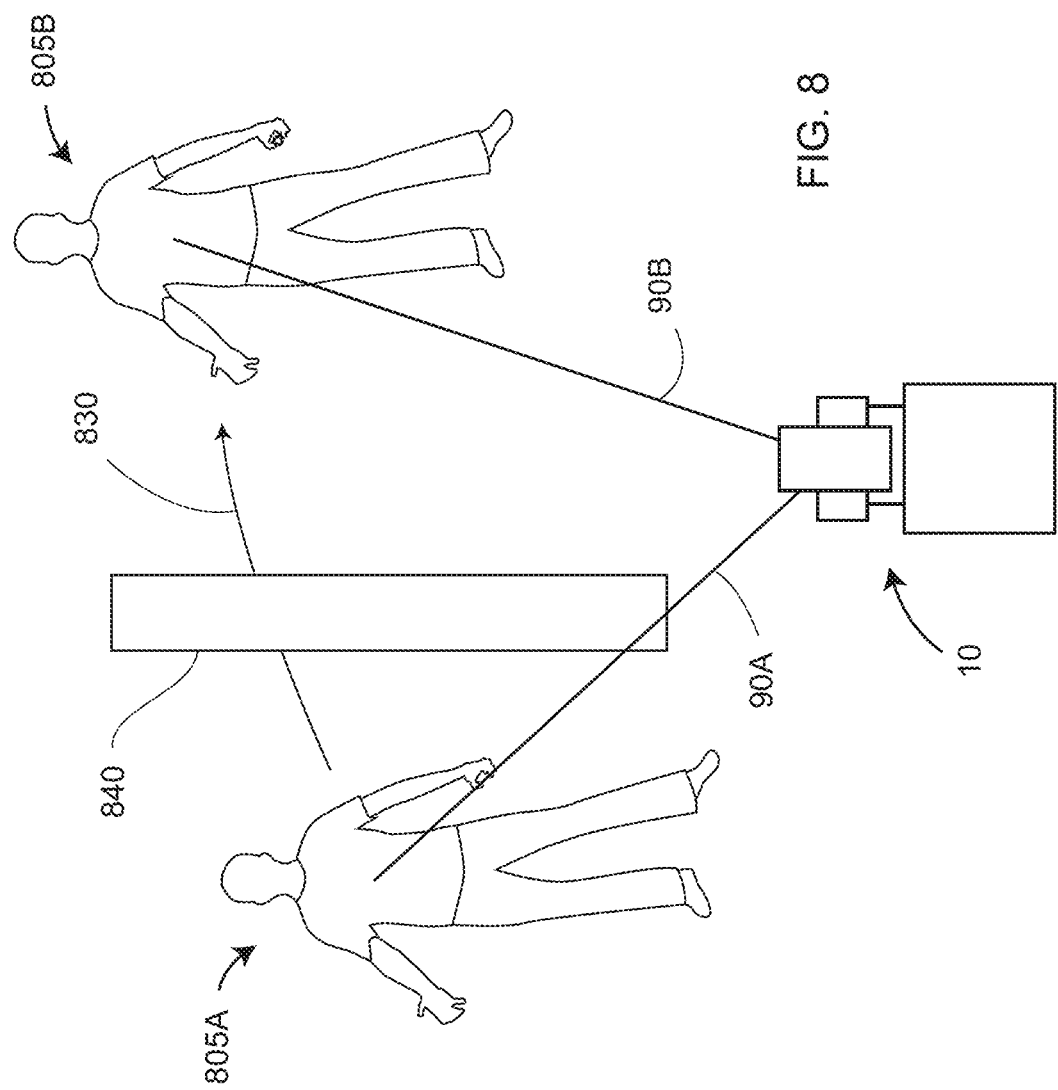
FIG. 8 is a schematic illustration of a user cooperating with a tracker in a user-follow mode.

In one embodiment, this problem is addressed by using gestures. As used herein, the term "gestures" includes the movement or positioning of the user's body, or portions therein, within the field of view of one or more cameras on the tracker 10. The term "gesture" may also include the movement or positioning of a target, such as the retroreflector 95 within the field of view of one or more cameras on the tracker 10. One type of gesture, illustrated schematically in FIG. 8 is a spatial gesture 97 of a retroreflector. If the tracker settings are configured to receive such gestures, an operator may move the move the retroreflector in a predetermined spatial gesture such as a horizontal or vertical movement. The movement of the retroreflector will be observed in a sequence of images obtained by the one or more target cameras such as the cameras 76, 78. A processor, such as the gestures pre-processor 626 of FIG. 6, evaluates the pattern to determine a command or operational control procedure that corresponds to the gesture. The operator may give a "come to this retroreflector" gesture, causing the beam of light to move from the retroreflector to which it is currently locked and moving to the retroreflector currently held by the user. Many other types of gestures are possible. Many such tracker gestures are described in U.S. Pat. No. 8,537,375, the contents of which are incorporated by reference herein.

In another mode of the tracker, the "user-follow" mode, the tracker 10 generally attempts to follow the movement of a user. Such a mode might be initiated by a gesture or by changing a setting in a smart device such as a smart phone or remote control. An example of a situation in which a user-follow mode would be useful is one in which a user wanted to walk up-stairs to continue a measurement. In a first step, an operator might give a gesture putting the tracker into user-follow mode. As the user walked up the stairs, the tracker would then direct the laser light 90A to follow movement of the user from a position 805A to a position 805B along a path 830 which might be behind an obstruction 840 or up the stairs whereon of the laser light 90B would remain on the user. Upon reaching the destination, the user might give another gesture causing the beam of light from the tracker to lock onto the retroreflector.

Another possible mode of the tracker is a "retro-grab" mode. In this mode, the beam of light points in a fixed direction and waits for the retroreflector to be brought into the beam of light so as to lock onto the retroreflector when the position detector is brought into the beam of light. In some cases, the operator wants to leave a beam of light fixed in position while moving from one location to another, and so this can often be a useful mode. Many other modes of the laser tracker are possible and the modes suggested here are in no way meant to be limiting.

There are several ways to switch between modes or to turn modes on or off. One method is to select the desired mode on a smart device such as a smart phone, a remote control, a tablet, or a computer. Another way to switch between modes is by using gestures.

For the case in which a retro-follow mode is used to follow a retroreflector of a six-DOF probe such as the retroreflector 440 of the probe 480 of FIG. 4A and FIG. 4B, the points of light such as the lights 472, 473, 474 may be turned off, if desired, when following the retroreflector in the retro-follow mode.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method comprising:
    for a tracker in a retro-follow mode, the tracker configured to emit and receive a beam of light:
    determining whether the beam of light emitted along an optical axis of the tracker is detected by a position detector of the tracker;
    when the beam of light is detected by the position detector, tracking on the retroreflector by causing the beam of light to move with the tracker to a retrace point of the position detector; and
    when the beam of light is not detected by the position detector, turning off the beam of light, attempting to identify a retroreflector in first images captured by one or more cameras of the tracker with the beam of light off, and steering the optical axis toward the identified retroreflector with the beam of light off, continuing until a retroreflector acquisition criterion has been met by the first images, thereafter turning on the beam of light.

2. The method of claim 1 wherein when the beam of light is detected within the position detector but not detected within a predetermined area of the position detector, steering the beam of light in a search pattern until the beam of light is detected within the predetermined area of the position detector, thereafter tracking on the retroreflector.

3. The method of claim 2 wherein the search pattern is a spiral search pattern.

4. The method of claim 1 further comprising:
    turning on one or more flashing light sources proximate the one or more cameras to produce flashing light; and
    reflecting the flashing light from the retroreflector onto the one or more cameras.

5. The method of claim 1 wherein the retroreflector acquisition criterion is based at least in part on a measure of movement, per unit of time, of the retroreflector in a succession of the first images.

6. The method of claim 5 wherein the measure of movement is based at least in part on one or more quantities selected from the group consisting of: angles, distances, and pixels.

7. The method of claim 1 wherein the retroreflector acquisition criterion is based at least in part on a position of the retroreflector in the first images.

8. The method of claim 1 wherein the tracker is placed in the retro-follow mode based at least in part on a gesture performed by a user.

9. The method of claim 8 wherein the gesture includes a spatial movement of the retroreflector.

10. The method of claim 9 wherein the spatial movement of the retroreflector is captured in a succession of the first images.

11. The method of claim 1 further comprising turning on the beam of light if the retroreflector is not identified in the first images within a prescribed time interval.

12. The method of claim 1 further comprising steering the optical axis to a new direction if the retroreflector is not identified in the first images.

13. The method of claim 1 wherein the tracker is placed in the retro-follow mode based at least in part on an entry made by an operator into a device that includes a processor.

14. The method of claim 1 further comprising:
    placing the tracker in a retro-grab mode;
    for the tracker in the retro-grab mode:
        turning on the beam of light;
        pointing the beam of light in a fixed direction until the beam of light, upon reflection from the retroreflector, is detected within the position detector;
        after receiving the beam of light within the position detector, moving the beam of light to arrive, upon reflection from the retroreflector, at a retrace point of the retroreflector; and
        tracking on the retroreflector based at least in part on the signal produced by the position detector in response to the beam of light reflected from the retroreflector onto the position detector.

15. The method of claim 14 wherein the retro-grab mode is activated with a gesture performed by a user.

16. The method of claim 1 further comprising:
    placing the tracker in a user-follow mode;
    for the tracker in the user-follow mode:
        attempting to identify a user in the first images of the one or more cameras of the tracker; and
        when the user is identified in the first images, steering the optical axis to follow movement of the user.

17. The method of claim 16 wherein the tracker is placed in the user-follow mode based at least in part on a gesture performed by a user.

18. The method of claim 1 further comprising in response to determining that the beam of light emitted on the optical axis of the tracker is not detected by the position detector, turning off at least one light marker that is positioned directly adjacent the retroreflector.

19. A three-dimensional (3D) measuring system comprising:
- a tracker including a source of light, a position detector, one or more target cameras, and a tracking system, the source of light operable to emit a beam of light along an optical axis of the tracker, the position detector operable to produce an electrical signal based at least in part on a position of light on a surface of the position detector, the position detector having a retrace point, the tracking system operable being to steer the optical axis;
- a processor coupled to the tracker, the processor operable to execute computer instructions that, when executed on the processor includes:
- determining whether the tracker is in a retro-follow mode;
- for the tracker in the retro-follow mode:
  - determining whether the beam of light emitted on the optical axis of the tracker is detected by the position detector;
  - when the beam of light is detected by the position detector, tracking on a retroreflector with the tracking system by moving the beam of light to arrive at the retrace point; and
  - when the beam of light is not detected by the position detector, turning off the beam of light, identifying the retroreflector in first images of the one or more target cameras with the beam of light off, steering the optical axis toward the retroreflector with the beam of light off until a retroreflector acquisition criterion has been satisfied by the first images, and thereafter turning on the beam of light.

20. The 3D measuring system of claim 19 wherein the processor is further operable to execute computer instructions that, when executed on the processor includes determining that the beam of light is detected within the position detector but not detected within a predetermined area of the position detector and, in response to so determining, steering the beam of light in a search pattern until the beam of light is detected within the predetermined area of the position detector, thereafter tracking on the retroreflector.

* * * * *